United States Patent
Nozaki et al.

(10) Patent No.: US 6,530,618 B2
(45) Date of Patent: Mar. 11, 2003

(54) SEALING STRUCTURE OF WEATHER STRIP FOR MOTOR VEHICLE

(75) Inventors: Masahiro Nozaki, Nishikasugai-gun (JP); Kiyotaka Tamaoki, Nishikasugai-gun (JP); Katsunori Kawai, Nishikasugai-gun (JP); Hidehiro Ito, Wako (JP)

(73) Assignees: Toyoda Gosei Co., Ltd., Aichi-ken (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/963,510

(22) Filed: Sep. 27, 2001

(65) Prior Publication Data

US 2002/0036414 A1 Mar. 28, 2002

(30) Foreign Application Priority Data

Sep. 27, 2000 (JP) .......................................... 2000-293296

(51) Int. Cl.⁷ ................................................ B60J 10/08
(52) U.S. Cl. .................. 296/146.9; 296/207; 49/480.1; 49/498.1
(58) Field of Search .............................. 296/146.9, 207, 296/76; 49/498.1, 480.1

(56) References Cited

U.S. PATENT DOCUMENTS

| | | | | |
|---|---|---|---|---|
| 1,928,992 A | * | 10/1933 | Clark et al. ............ | 49/498.1 X |
| 2,451,450 A | * | 10/1948 | Spraragen ................... | 49/498.1 |
| 6,012,760 A | * | 1/2000 | Nozaki ..................... | 296/146.9 |

FOREIGN PATENT DOCUMENTS

| | | | | |
|---|---|---|---|---|
| JP | 358063516 | * | 4/1983 | .............. 296/146.9 |

* cited by examiner

*Primary Examiner*—Dennis H. Pedder
(74) *Attorney, Agent, or Firm*—Pillsbury Winthrop LLP

(57) ABSTRACT

A sealing structure for forming a seal between a weather strip attached to a door opening portion of a vehicle body, and a periphery of a vehicle door. The weather strip includes a base portion having a generally U-shaped cross-section for attachment to the door opening portion, and a tubular seal portion which expands from an outer side wall of the base portion. A projection is formed in the weather strip so as to project from the outer side wall of the base portion into an interior of the tubular seal portion so as to be spaced from an inner surface of a projecting top of a sealing wall of the tubular seal portion. When the vehicle door is closed, an inside surface of a periphery of a door panel contacts and presses the projecting top of the sealing wall, which faces the projecting end of the projection, while an inside surface of a door frame contacts and presses a side part of the sealing wall apart from the projecting top of the sealing wall.

3 Claims, 3 Drawing Sheets

SEALING STRUCTURE OF WEATHER STRIP FOR MOTOR VEHICLE

BACKGROUND OF THE INVENTION

This application is related to and claims priority from Japanese Patent Application No. 2000-295296, incorporated herein by reference.

1. Field of the Invention

The present invention relates to a sealing structure of a weather strip for a motor vehicle and, more particularly, to a sealing structure of a weather strip for forming a seal between a door opening portion around an opening in a side body of the motor vehicle and a periphery of a vehicle door.

2. Description of Related Art

As shown in FIG. 1, weather strips 10 are attached to door opening portions around door openings formed in a side body of a motor vehicle. As shown in FIGS. 2(A) and 2(B), which are cross-sectional views taken along lines A—A and B—B of FIG. 1, the weather strip 10 includes a base portion 14 having a generally U-shaped cross-section, and a tubular seal portion 16 having an arc-shaped sealing wall. The tubular seal portion 16 expands from one side wall of the base portion 14. The base portion 14 is mounted on a flange 18 which is provided in the door opening portion including the center pillar 12 such that the tubular seal portion 16 is located outside the flange 18. When a vehicle door 20a is closed, as shown in FIG. 2(A), in an upper door opening portion, an inside surface of a door frame 22 contacts and presses the seal portion 16, and, as shown in FIG. 2(B), in a lower door opening portion, an inside surface of a periphery of a door panel 24 contacts and presses the seal portion 16.

In these drawings, reference numeral 26 designates a pillar garnish for covering an inside surface of the center pillar 12, and reference numeral 28 designates a door weather strip which is attached to inside surfaces of the door frame 22 and the door panel 24 (a door weather strip attached to the door panel 24 is not shown).

When vehicle doors are closed hard, or when vehicle bodies vibrate for some reason, peripheries of the vehicle doors may abut door opening portions around door openings. For solving this problem, stoppers are generally provided in the vehicle doors. FIG. 3 illustrates one example of such stoppers. As shown, a stopper 30 is composed of a rubber-like resilient material and is provided in a rear lower corner of the door panel 24 of the door 20a (FIG. 1). The stopper 30 is fitted in an aperture 32 formed in an inner panel of the door panel 24.

With this arrangement, the stopper 30 must be prepared separately. A punching work is needed to form the aperture 32 in the door panel 24, and a contact surface 34 for the stopper 30 must be formed in the center pillar 12. Consequently, the production costs increase.

To reduce the production costs, it has been proposed to use weather strips which can serve as stoppers. In one example of such weather strips, the interior of the tubular seal portion thereof is partly filled with a solid rubber material (Publication of Japanese unexamined utility model application No. Sho. 63-82657).

These weather strips, however, cause increase of the forces required for closing vehicle doors. When the vehicle doors are closed hard, they receive large counterforces from these weather strips. Furthermore, weather strips of which tubular seal portions are partly filled with solid rubber materials must be prepared separately from the weather strips which have normally configured tubular seal portions, and these two types of weather strips must be joined to each other.

SUMMARY OF THE INVENTION

Accordingly, it is an object of the present invention to provide a sealing structure of a weather strip for attachment along a door opening portion of a vehicle body, which is capable of achieving a door stopper function without increasing a door closing force.

With the sealing structure in accordance with the present invention, the weather strip includes a base portion for attachment along a door opening portion around a door opening formed in a vehicle body, and a tubular seal portion having an arc-shaped sealing wall which expands outwardly from a side surface of the base portion so as to be contacted and pressed by a periphery of a vehicle door when the vehicle door is closed. A projection projects from the side surface of the base portion into the tubular seal portion in such a manner as to divide an interior of the tubular seal portion into halves in a width direction thereof. The projection extends in a longitudinal direction of the base portion. A projecting end of the projection faces an inner surface of the sealing wall with spacing. The weather strip and the vehicle door are arranged such that, in a door closed state a periphery of a door panel of the vehicle door contacts and presses about a projecting top of the sealing wall of the tubular seal portion, which faces the projecting end of the projection, and a door frame of the vehicle door contacts and presses a side part of the sealing wall of the tubular seal portion apart from the projecting top of the sealing wall.

With this arrangement, the projection abuts only the door panel through the sealing wall of the tubular seal portion upon closing the vehicle door, and achieves a door stopper function only against the door panel.

When the vehicle door is closed, the door panel receives a counterforce from the projection. However, the weight of the door panel is much greater than that of the door frame. Accordingly, the force required for closing the vehicle door is hardly increased with the counterforce from the projection, and when the vehicle door is closed hard, the vehicle door does not receive a large counterforce from the weather strip.

The sealing structure in accordance with the present invention can be preferably applied to vehicles in which, in a door closed state, the space between the inside surface of the door frame and a facing door opening portion is larger than that between a periphery of the door panel and a facing door opening portion.

Other objects, features, and characteristics of the present invention will become apparent upon consideration of the following description and the appended claims with reference to the accompanying drawings, all of which form a part of this specification.

BRIEF DESCRIPTION OF THE DRAWINGS

FIG. 4 (B) is a cross-sectional view of a sealing structure in accordance with the present invention, which is taken along the line B—B of FIG. 1.

DETAILED DESCRIPTION OF THE PREFERRED EMBODIMENTS

Figure 1:
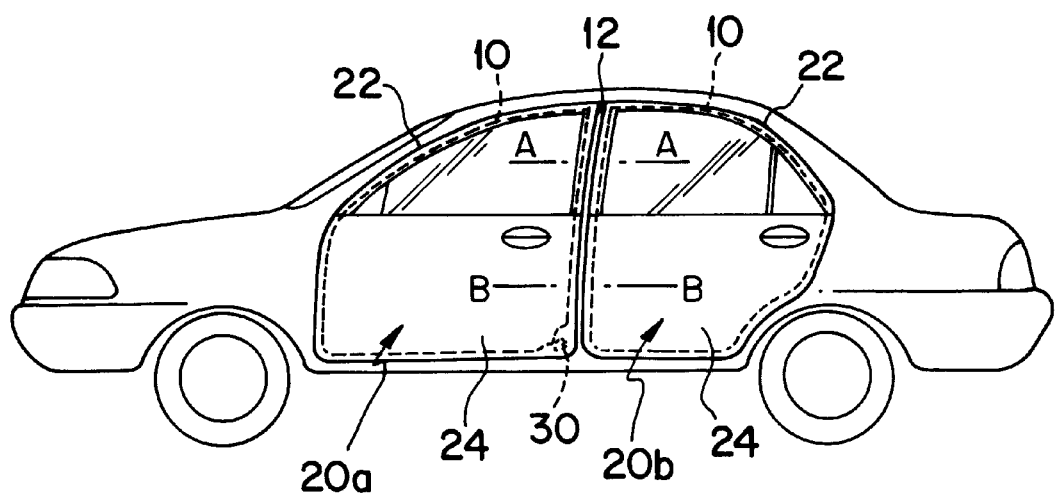
FIG. 1 is a side view of a motor vehicle.
Figure 2A:
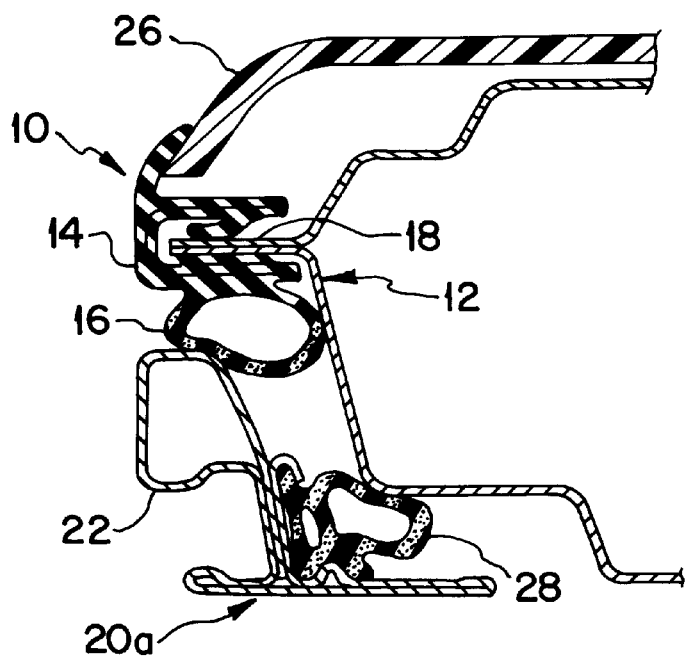
FIG. 2(A) is a cross-sectional view of a conventional sealing structure of a weather strip, which is taken along the line A—A of FIG. 1.
Figure 2B:
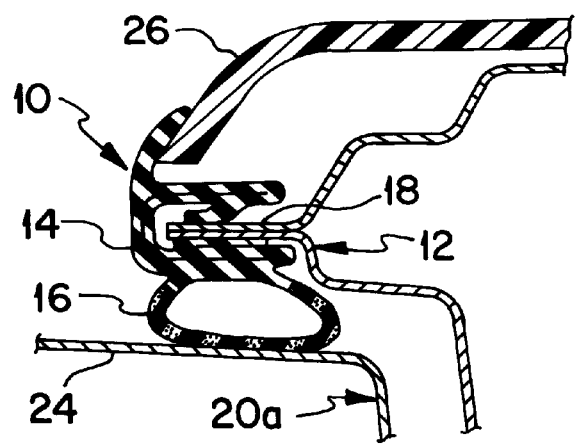
FIG. 2(B) is a cross-sectional view of a conventional sealing structure of a weather strip, which is taken along the line B—B of FIG. 1.
Figure 3:
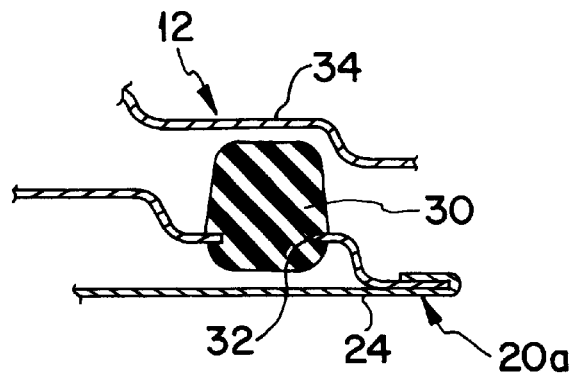
FIG. 3 is a sectional view of a conventional stopper which is provided in a vehicle door.
Figure 4A:
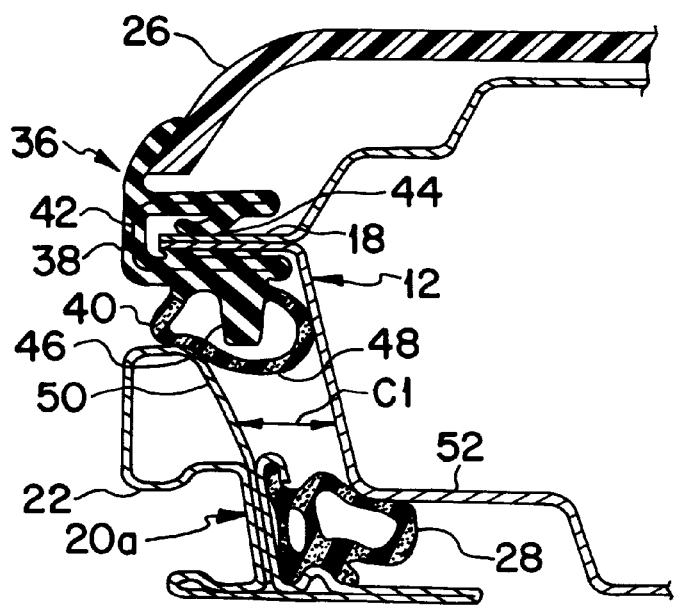
FIG. 4 (A) is a cross-sectional view of a sealing structure in accordance with the present invention, which is taken along the line A—A of FIG. 1.
Figure 4B:
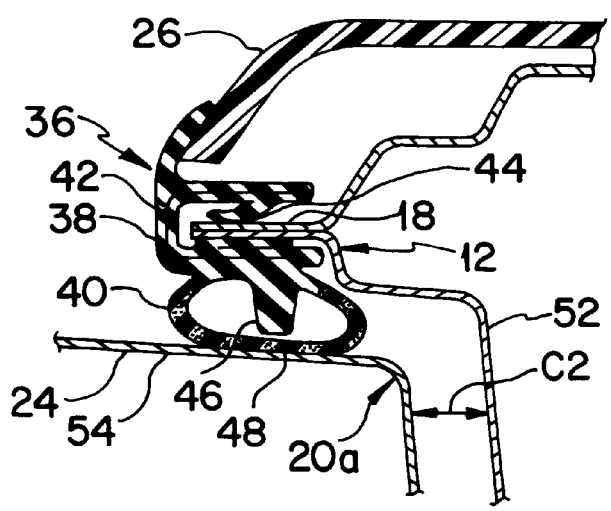

FIG. 4(A) and FIG. 4(B) illustrate a sealing structure between a center pillar 12 and a rear vertical end portion of a front door 20a.

A weather strip 36 is composed of an extruded body, and includes a base portion 38 having a generally U-shaped cross-section and a tubular seal portion 40 having an arc-shaped sealing wall. The base portion 38 is composed of a solid rubber. A metal core 42 is embedded in the base portion 38. Lips 44 project inwardly from facing inner surfaces of the base portion 38.

The tubular seal portion 40 is composed of a sponge rubber and expands outwardly from one side wall of the base portion 38. A projection 46 projects from the base portion 36 between a pair of roots of the sealing wall of the tubular seal portion 40 into an interior of the tubular seal portion 40 so as to divide it into halves in the width direction thereof. A projecting end of the projection 46 faces an inner surface of a projecting top 48 of the sealing wall of the tubular seal portion 40 with a space corresponding to about one third of the height of the tubular seal portion 40. The projection 46 has a tapered configuration with a trapezoidal cross-section and a substantially flat end surface, and is composed of the solid rubber, similarly to the base portion 38. The weather strip 36 thus arranged is integrally formed by extrusion.

A flange 18 is provided along a door opening portion from its front lower end to its rear lower end by way of its roof-side part. The flange 18 is formed by joining a peripheral end part of an inner panel and that of an outer panel to each other. The base portion 38 of the weather strip 36 is mounted on the flange 18 such that the lips 44 hold both sides of the flange 18. The tubular seal portion 40 expands outwardly of the vehicle body. The weather strip 36 is attached close to the door opening portion to enlarge the opening area of the door opening. Lower ends of the door opening portion along with lower ends of the weather strip 36 are respectively covered with scar plates (not shown).

When the front door 20a is closed, an upper half of the door opening portion faces the door frame 22 (FIG. 4(A)) while a lower half thereof faces the periphery of the door panel 24 (FIG. 4(B)). An inside surface 50 of the door frame 22, which faces the upper half of the center pillar 12, has a configuration confirming to the upper half of an outer panel 52 of the center pillar 12. An inner panel 54 of the periphery of the door panel 24, which faces the lower half of the center pillar 12, has a configuration confirming to the lower half of the outer panel 52 of the center pillar 12.

The width C1 of a space between the inside surface 50 of the door frame 22 and the facing outer panel 52 of the center pillar 12, and the width C2 of a space between the inner panel 54 of the periphery or the door panel 24 and the facing outer panel 52 of the center pillar 12 are respectively set so small as not to cause contacting of the front door 20a and the center pillar 12 when the vehicle body vibrates.

When the vehicle body vibrates, the door frame 22 largely vibrates, as compared with the door panel 24. The door frame 22 is also twisted due to the vibration thereof. Considering these circumstances, the width C1 has been set greater than the width C2.

The inner panel 54 of the door panel 24 and the tubular seal portion 40 are arranged such that the inner panel 54 of the door panel 24 contacts the projecting top 48 of the sealing wall of the tubular seal portion 40 and presses it against the projecting end of the projection 46 when the front door 20a is closed. In contrast, the inside surface 50 of the door frame 22 and the tubular seal portion 40 are arranged such that the inside surface 50 of the door frame 22 contacts and presses the side part of the sealing wall of the tubular seal portion 40 apart from the projecting top 48 thereof when the front door 20a is closed. In FIGS. 4(A) and 4(B), reference numeral 26 designates a pillar garnish, and 28 designates a door weather strip.

In the closing process of the front door 20a. in the lower half of the door opening portion, the inner panel 54 of the door panel 24 approaches the tubular seal portion 40 in a direction facing the projecting end of the projection 46, and then contacts and presses the projecting top 48 of the sealing wall of the tubular seal portion 40 against the projecting end of the projection 46. In the upper half of the door opening portion, the inside surface 50 of the door frame 22 abuts the side part of the sealing wall apart from the projection 46. Then, the front door 20a is pushed back by the weather strip 36 and slightly returns in an opening direction thereof. In the door closed state, in the upper half of the door opening portion, as shown in FIG. 4(A), the inside surface 50 of the door frame 22 pushes the side part of the sealing wall of the tubular seal portion 40, and in the lower half of the door opening portion, as shown in FIG. 4(B), the inner panel 54 of the door panel 24 pushes the tubular seal portion 40 around the projecting top 48 thereof so as to face the projecting end of the projection 46 with spacing.

In the preceding embodiment, the present invention is applied to the sealing structure along the center pillar 12. In the sealing structure along a roof-side part of the door opening portion and a lower half of a front pillar, the door frame and the door panel of the vehicle door respectively abut the tubular seal portion, similarly to the sealing structure along the center pillar.

With this arrangement, upon closing the front door 20a, the door frame 22 does not receive any counterforce from the projection 46 of the weather strip 36. Only the door panel 24 receives such a counterforce. However, the weight of the door panel 24 is much greater than that of the door frame 22. Accordingly, the force required for closing the front door 20a hardly increases with the counterforce from the projection 46. In addition, when the front door 20a is closed hard, the door frame 22 does not abut the projection 46. Accordingly, the door frame 22 is prevented from being strongly pushed back by the projection 46. Since the projection 46 has a tapered configuration, when the door panel 24 presses the projection 46 through the sealing wall of the tubular seal portion 40, the projection 46 does not exert a large counterforce against the door panel 24.

In the preceding embodiment, the present invention is applied to the vehicle in which the width C1 of the space between the door frame 22 and the center pillar 12 is set greater than the width C2 of the space between the door panel 24 and the center pillar 12. The present invention is also applicable to the vehicle in which the width C1 and the width C2 are set substantially identical to each other. In this case, the inside surface 50 of the door frame 22 is formed such that, in the door closed state, a projecting part thereof is located in the position offset from the projecting top 48 of the sealing wall of the tubular seal portion 40.

With the sealing structure in accordance with the present invention, by virtue of the projection which is integrally provided in the weather strip for attachment along the door opening portion, overstroking of the vehicle door can be prevented without increasing the force required for closing the vehicle door.

While the invention has been described in connection with that are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A sealing structure of a weather strip for a motor vehicle, which is attached along a door opening portion around a door opening formed in a side body of the motor vehicle, against a periphery of a vehicle door, wherein:

said weather strip includes a base portion by means of which the weather strip is attached along the door opening portion, and a tubular seal portion having an arc-shaped sealing wall, which extends outwardly from a side surface of said base portion in a direction opposite to a direction in which the door closes, and is adapted to be contacted and pressed by said periphery of said vehicle door when said vehicle door is closed;

said base portion has a projection which projects from said side surface of said base portion into said tubular seal portion in such a manner as to divide an interior of said tubular seal portion into halves in a width direction thereof, said projection extending in a longitudinal direction of said base portion, a projecting end of said projection facing an inner surface of said tubular seal portion;

said weather strip is an extruded body of a rubber-like resilient material, said base portion and said projection are composed of a solid material, and said tubular seal portion is composed of a sponge material; and said weather strip and said vehicle door are arranged such that, in a lower half of the door opening portion, during closing of the door, a periphery of a door panel of said vehicle door, when overstroking, abuts said projecting end of said projection via a projecting top of said sealing wall of said tubular seal portion, and, when the door is closed, said periphery of said door panel contacts and presses said projecting top of said sealing wall of said tubular seal portion, which faces said projecting end of said projection with spacing, while, in an upper half of the door opening portion, during closing of the door, a door frame of said vehicle door contacts and presses a side part of said tubular seal portion apart from said projecting top of said sealing wall without abutting said projecting end of said projection via said sealing wall of said tubular seal portion, and, when the door is closed, said door frame maintains contact with and presses said side part of said tubular seal portion.

2. A sealing structure of a weather strip for a motor vehicle, which is attached along a door opening portion around a door opening formed in a side body of the motor vehicle, against a periphery of a vehicle door, wherein:

said weather strip includes a base portion by means of which the weather strip is attached along the door opening portion, and a tubular seal portion having an arc-shaped sealing wall, which extends outwardly from a side surface of said base portion, and is adapted to be contacted and pressed by said periphery of said vehicle door when said vehicle door is closed;

said base portion has a projection which has a tapered configuration with a trapezoidal cross-section and projects from said side surface of said base portion into said tubular seal portion in such a manner as to divide an interior of said tubular seal portion into halves in a width direction thereof, said projection extending in a longitudinal direction of said base portion, a projecting end of said projection facing an inner surface of said tubular seal portion with spacing;

said weather strip is an extruded body of a rubber-like resilient material, said base portion and said projection are composed of a solid material, and said tubular seal portion is composed of a sponge material; and said weather strip and said vehicle door are arranged such that, when the door is closed, a periphery of a door panel of said vehicle door contacts and presses a projecting top of said sealing wall of said tubular seal portion, which faces said projecting end of said projection, and a door frame of said vehicle door contacts and presses a side part of said tubular seal portion apart from said projecting top of said sealing wall.

3. A sealing structure as claimed in claim 2, wherein said base portion has a generally U-shaped cross-section and is mounted on a flange formed in the door opening portion, said tubular seal portion expands from a surface of an outer side wall of said base portion, a pair of root parts of said sealing wall are joined to said surface of said outer side wall so as to be spaced apart from each other, and said projection projects into said interior of said tubular seal portion from said surface of said outer side wall between said pair of root parts of said sealing wall.

* * * * *